H. O. WINFREY.
MACHINE FOR MAKING TAMALES.
APPLICATION FILED FEB. 16, 1917.

1,271,406.

Patented July 2, 1918.
5 SHEETS—SHEET 4.

WITNESSES

INVENTOR
H. O. Winfrey.
BY Victor J. Evans
ATTORNEY

H. O. WINFREY.
MACHINE FOR MAKING TAMALES.
APPLICATION FILED FEB. 16, 1917.

1,271,406.

Patented July 2, 1918.
5 SHEETS—SHEET 5.

WITNESSES
F. C. Gibson.
Wm. Bagger.

INVENTOR
H. O. Winfrey.

BY Victor J. Evans
ATTORNEY

UNITED STATES PATENT OFFICE.

HERBERT O. WINFREY, OF AUSTIN, TEXAS.

MACHINE FOR MAKING TAMALES.

1,271,406.   Specification of Letters Patent.   Patented July 2, 1918.

Application filed February 16, 1917. Serial No. 149,107.

*To all whom it may concern:*

Be it known that I, HERBERT O. WINFREY, a citizen of the United States, residing at Austin, in the county of Travis and State of Texas, have invented new and useful Improvements in Machines for Making Tamales, of which the following is a specification.

This invention relates to machines for making tamales and like articles which consist of an outer tubular sheath and a core or filling within the same, the machine being applicable to the manufacture of cakes and pastries possessing these characteristics.

The invention has for its object to produce a machine of simple and improved construction whereby the manufacture of the product may be carried on continuously, the product being formed in a continuous length which may be subsequently divided into pieces of proper size for wrapping or such further treatment as may be desired.

A further object of the invention is to produce a machine of the class described embodying in its construction a primary feed screw operating within a housing and adapted to eject from said housing the material of which the sheath is formed, said primary feed screw being of hollow or tubular construction, and a secondary feed screw operating within the primary feed screw and adapted to eject through the latter the filling material within the tubular sheath.

Further objects of the invention are to simplify and improve the general construction and assemblage of parts of the improved machine.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings.

Corresponding parts in the several figures of the drawings are denoted by like characters of reference.

Figure 1:
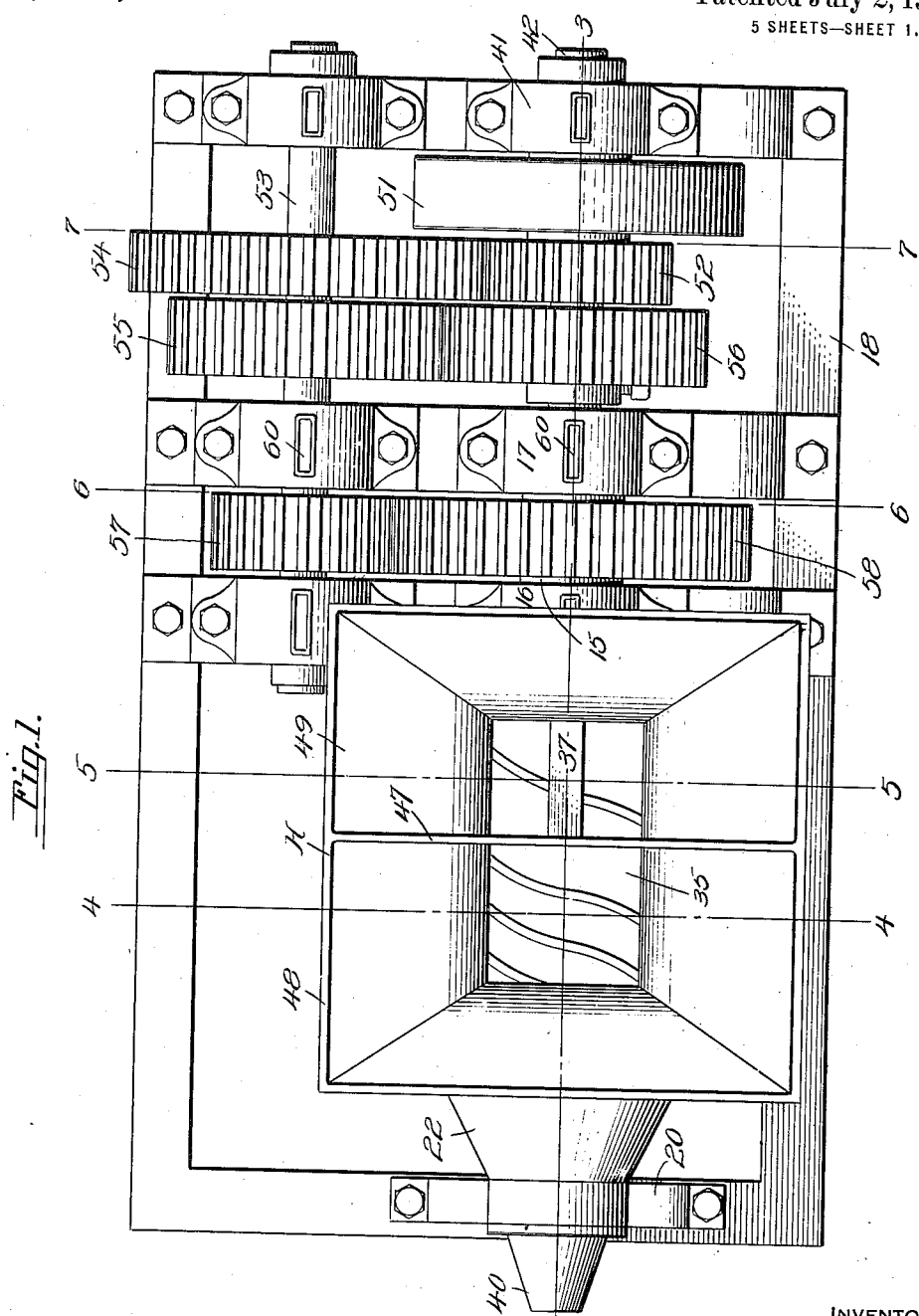
Figure 1 is a top plan view of a machine constructed in accordance with the invention.
Figure 2:
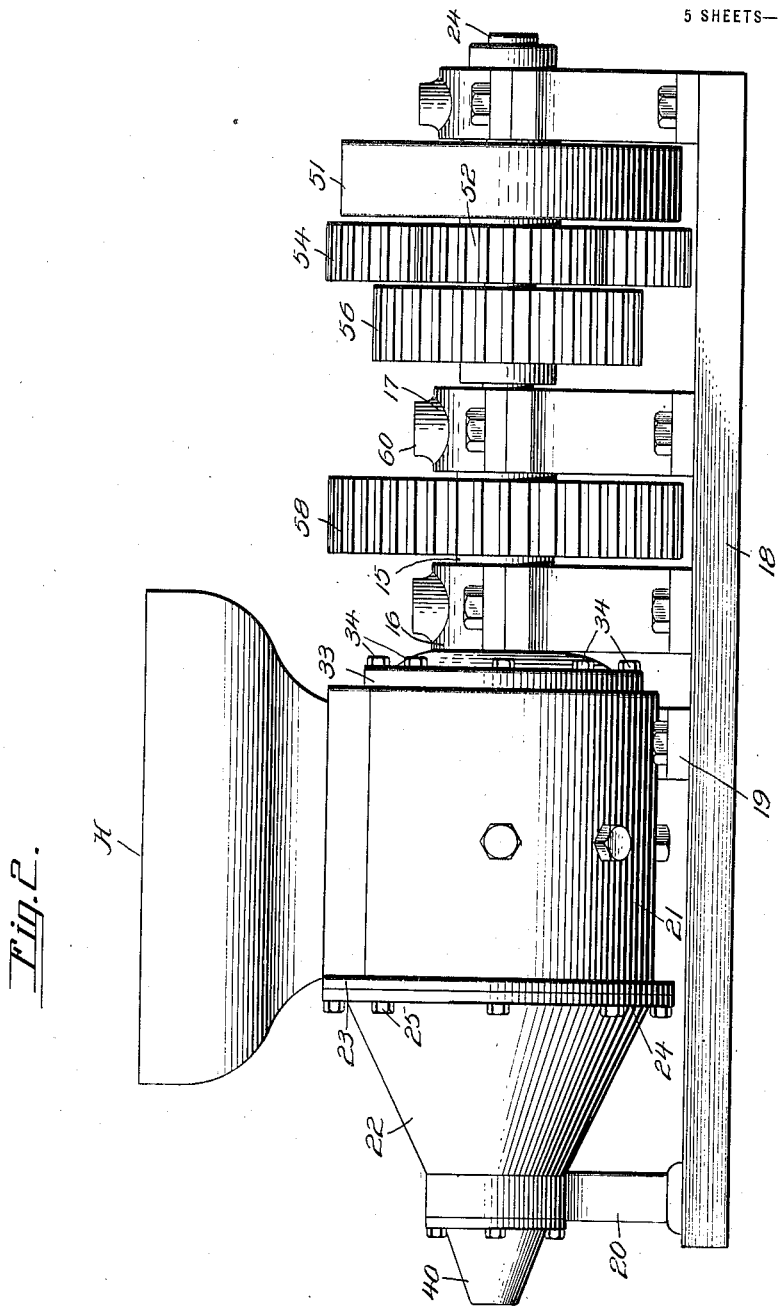
Fig. 2 is a side elevation of the same.
Figure 3:
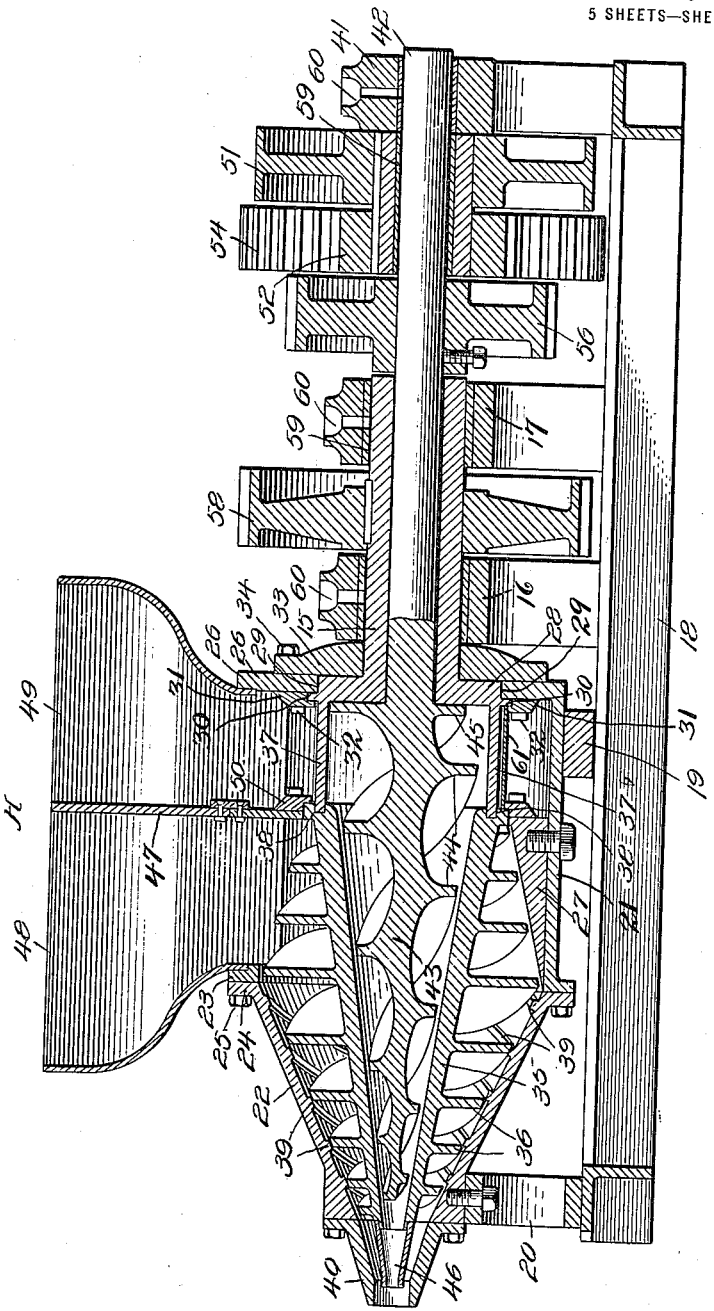
Fig. 3 is a longitudinal sectional view taken on the line 3—3 in Fig. 1.
Figure 4:
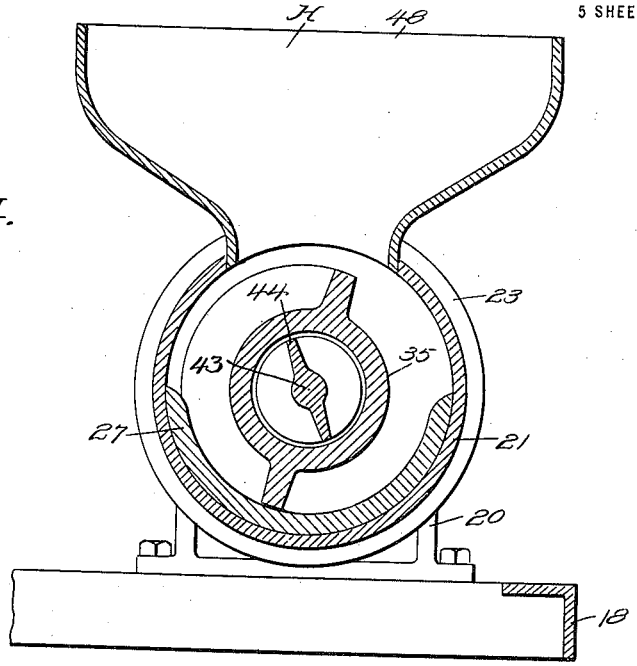
Fig. 4 is a transverse sectional view taken on the line 4—4 in Fig. 1.
Figure 5:
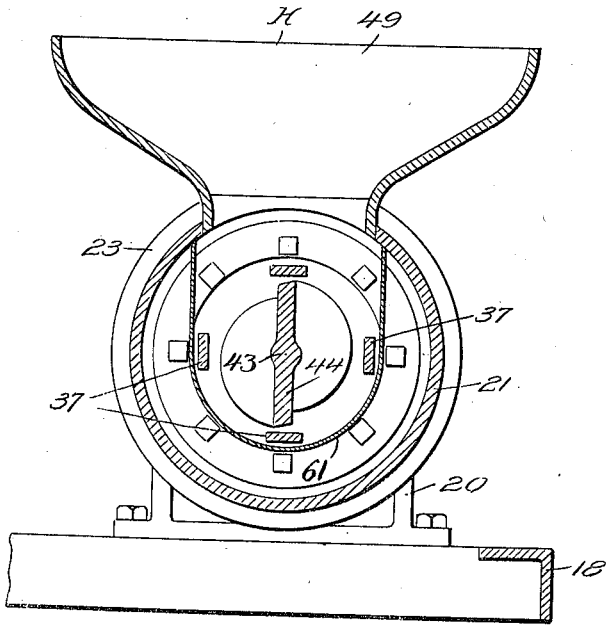
Fig. 5 is a transverse sectional view taken on the line 5—5 in Fig. 1.
Figure 6:
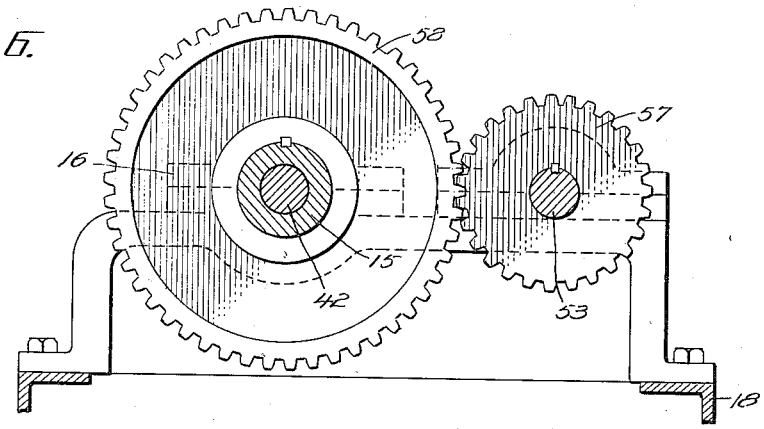
Fig. 6 is a transverse sectional view taken on the line 6—6 in Fig. 1.
Figure 7:
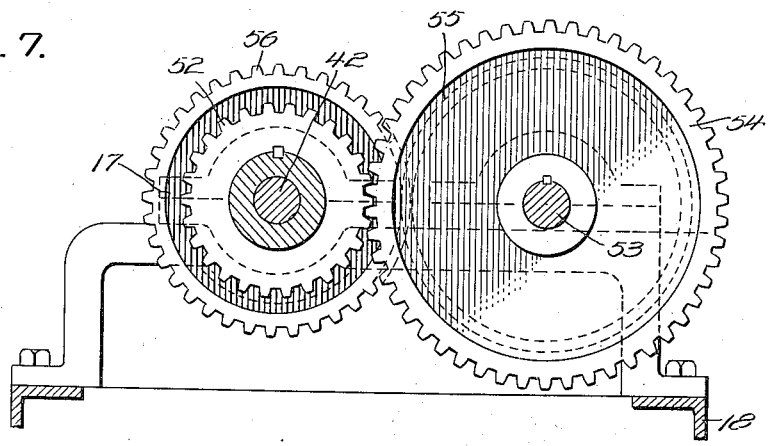
Fig. 7 is a transverse sectional view taken on the line 7—7 in Fig. 1.
Figure 8:
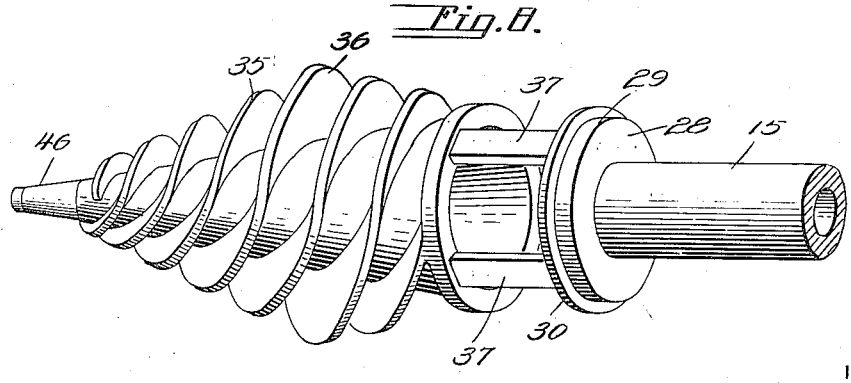
Fig. 8 is a perspective detail view illustrating the connection of the primary feed screw with the tubular shaft carrying the same.

15 designates a tubular shaft which is mounted for rotation in bearings 16 and 17 that are supported on a base frame 18 which latter has been shown as being constructed of angle iron. The base frame also carries supports 19 and 20 for the casing or housing of the machine, said housing being composed of an approximately cylindrical portion 21 and a conical portion 22, said cylindrical and conical portions being provided at their meeting ends with flanges 23 and 24 for the passage of connecting members such as bolts or machine screws 25 whereby the parts are securely and rigidly connected together. The cylindrical member of the housing is provided at its front end with a circumferential flange 26, and secured in said cylindrical portion at the rearward end and in the lower part thereof is a filler 27 of substantially triangular cross section, said filler presenting a tapered surface opposed to the conical housing member 22 with which it merges as will be best seen in Fig. 3 of the drawings.

The tubular shaft 15 is provided at its rearward end with a flange 28 which operates within the annular flange 26 of the housing, said flange 28 being provided with a circumferential recess 29 that fits snugly within the opening produced by the flange 26. The recess 29 produces a circumferential bead 30 that lies within the housing and is partly covered by an annular molding 31 which is secured on the flange 26 by fastening members 32, and whereby a very tight joint is produced between the flanges 28 and 26. A ring or gasket 33 is also secured by fastening members 34 externally on the flange 26 and surrounding the tubular shaft 15 to assist in producing a snug bearing for said tubular shaft.

Connected with and carried by the flange 28 of the tubular shaft 15 is a primary feed screw 35, said primary feed screw 35 consisting of a hollow cone having an externally disposed spiral flange 36, said spiral flange being of relatively great width near its middle portion from which it tapers in one direction toward the base and in the other direction toward the apex of the cone. The member 35 is connected with the flange 28 of the tubular shaft by means of arms or braces 37 of which any desired number may be used to insure the necessary strength and rigidity, said arms or braces being circumferentially disposed with respect to the flange 28 and to the base of the cone. It is, however, important that said arms be not placed so closely together as to interfere with the passage of material therebetween from the source of supply to the interior of the cone 35. The arms or braces 37 may be formed integrally with or they may be suitably secured upon the flange 28; by the construction shown in the drawings the rearward ends of the arms 37 are loosely engaged in sockets or recesses 38 in the base of the cone 35, this construction facilitating disassemblage of the parts for cleaning or other purposes. The rearward portion of the flange 36 is adapted to fit rather snugly within the conical housing member 22, and in such a manner that it may rotate freely within said housing. The conical housing member has been shown as being equipped on its interior face with spirally disposed ribs 39 which while not interfering with the rotation of the feed screw will assist in giving free movement to material that is being fed through the housing by the action of the feed screw. The conical housing member has been shown as being equipped with a discharge nozzle 40 which is detachably bolted or otherwise secured thereon, thus enabling nozzles of various dimensions and shapes to be utilized in connection with the machine.

Supported for rotation within the tubular shaft 15 and also partly supported by an auxiliary bearing member 41 is a shaft 42 carrying at its rear end the secondary feed screw 43 which is of substantially conical form, the spirally disposed feed flange 44 of said screw being tapered in the direction of the apex at the rearward end of the feed screw, the latter being thus adapted to fit rather snugly within the hollow primary feed screw. The spiral flange 44 terminates at the face thereof in a plane flange 45 which snugly engages the opposed face of the flange or collar 28 of the tubular shaft 15. The primary feed screw is provided at its rearward end with a detachable nozzle 46 which may be mounted thereon in any convenient manner, said nozzle extending within the discharge nozzle 40 of the housing.

The housing has in the upper portion thereof a feed opening adjacent to which a hopper H is suitably mounted, said hopper being provided with a partition plate 47 whereby two compartments are produced, one of said compartments, 48, communicating with the external portion of the primary feed screw. The other compartment, 49, communicates with the external portion of the secondary feed screw as will be clearly seen in Fig. 3 of the drawings, material being permitted to pass from the said compartment 49 through the interspaces between the arms or braces 37. A ring or gasket 50 surrounds the base of the primary feed screw, said gasket being secured partly on the partition member 47 and partly on the filler 27 so as to produce a snug joint between said members and the base of the conical feed screw 35.

Supported for rotation loosely on the shaft 42 is a band wheel 51 adapted to receive motion from a convenient source of power, and securely connected with said band wheel for rotation therewith is a pinion 52. 53 designates a countershaft on which is mounted a spur wheel 54 meshing with the pinion 52. Said countershaft also carries a spur wheel 55 meshing with a gear wheel 56 which latter is fixed on the shaft 42. The shaft 53 also carries a spur wheel 57 meshing with a gear wheel 58 which is fixed on the tubular shaft 15. Keys, splines or other well known means may be utilized to fix the gear wheels on their respective shafts. It will also be understood that bushings or anti-friction bearings of any well known kind may be employed, such bushings having been illustrated at 59. It will also be understood that well known means may be resorted to for the purpose of lubricating the bearings, ordinary oil cups having been indicated at 60.

Supported in the cylindrical housing, below the hopper compartment 49, is a bottom member 61 the office of which is to hold the filling material placed in the hopper compartment 49 up toward the second feed screw. This bottom member may be supported on the rings or gaskets 31 and 50 or in any other convenient manner that may suggest itself.

In the operation of this machine, meal, dough or plastic paste of any kind suitable to form the outer sheath or casing of the product is placed in the hopper compartment 48 and seasoned meat, fruit paste or other material suitable for the filling is placed in the hopper compartment 49. When the machine is driven the contents of the hopper compartment 48 will be ejected by the action of the primary feed screw through the nozzle 40 of the housing, a tubular formation being imparted to the material thus ejected by the nozzle 46 which projects within the nozzle 40. By the action of the secondary feed screw, the contents of the hopper compartment 49 will be ejected through the hollow conical feed screw 35 and through the nozzle 46 of the same, the filling taking the form of a continuous rod which is projected within the tubular sheathing or casing. The operation is continuous as long as the supply lasts, it being evident that the contents of the hopper compartments may be replenished while the machine is in operation. The product ejected from the machine may be subsequently treated in any desired manner which is no part of the present invention.

Having thus described the invention, what is claimed as new is:

1. In a machine of the class described, a housing including a substantially cylindrical member and a substantially conical member, a primary feed screw of hollow conical form operating in the housing and having a feed flange tapering toward the base and also toward the apex of the cone from an intermediate point thereof, that portion of the feed flange that tapers toward the apex of the cone being adapted to fit within the conical housing member, and a filler of triangular cross section secured in the lower portion of the cylindrical member of the housing and tapering in the direction of the conical housing member to present a bearing surface for that portion of the feed flange which tapers toward the base of the cone.

2. In a machine of the class described, a housing having a substantially cylindrical member and a substantially conical member, a tubular shaft supported for rotation externally of the housing and having a flange fitted and operating in an end wall of the cylindrical member of the housing, a primary feed screw of hollow conical form operating in the housing, spaced arms connecting the primary feed screw with the tubular shaft and a secondary feed screw operating within the primary feed screw.

3. In a machine of the class described, a tubular shaft supported for rotation, a primary feed screw of hollow conical form, and spaced arms connecting the feed screw with the tubular shaft, said arms being spaced apart to permit passage of material therebetween and within the hollow conical feed screw and a secondary feed screw operating within the primary feed screw.

4. In a machine of the class described, a housing including a conical member having a discharge nozzle, a tubular shaft supported for rotation externally of the housing and having a portion thereof projecting within the housing, a primary feed screw of hollow conical form operating in the housing, spaced arms connecting said primary feed screw with the tubular shaft for rotation therewith, a secondary feed screw of conical form disposed axially within the primary feed screw, and the spaced connecting arms to permit passage of material between said arms to the space intermediate the primary and secondary feed screws, a shaft carrying the secondary feed screw, said shaft being disposed for rotation within the tubular shaft, and means for driving the shafts carrying the feed screws.

5. In a machine of the class described, a housing including a conical member having a discharge nozzle, a tubular shaft supported for rotation externally of the housing and having a portion thereof projecting within the housing, a primary feed screw of hollow conical form operating in the housing, spaced arms connecting said primary feed screw with the tubular shaft for rotation therewith, a secondary feed screw of conical form disposed axially within the primary feed screw and the spaced connecting arms to permit passage of material between said arms to the space intermediate the primary and secondary screws, a shaft carrying the secondary feed screw, said shaft being disposed for rotation within the tubular shaft, and means for driving the shafts carrying the feed screws, in combination with means for supplying cover material to the space between the primary feed screw and the housing, and means for supplying filling material to the space between the primary and secondary feed screws.

6. In a machine of the class described, a housing including a conical member having a discharge nozzle, a tubular shaft supported for rotation externally of the housing and having a portion thereof projecting within the housing, a primary feed screw of hollow conical form operating in the housing, spaced arms connecting said primary feed screw with the tubular shaft for rotation therewith, a secondary feed screw of conical form disposed axially within the primary feed screw and the spaced connecting arms to permit passage of material between said arms to the space intermediate the primary and secondary feed screws, a shaft carrying the secondary feed screw, said shaft being disposed for rotation within the tubular shaft, and means for driving the shafts carrying the feed screws, in combination with means for supplying cover material to the space between the primary feed screw and the housing, and means for supplying filling material to the space between the primary and secondary feed screws, said means including a false bottom member supported in the cylindrical member of the housing to hold the filling material up to the secondary feed screw.

7. In a machine of the class described, a housing comprising a substantially cylindrical member having a feed opening and a substantially conical member having a discharge opening, a primary feed screw of hollow conical form operating in the housing, the tubular shaft supported for rotation externally of the housing having a portion thereof projecting through an end wall of the cylindrical housing member, spaced arms connecting the primary feed screw with the tubular shaft, a shaft supported for rotation in the tubular shaft, a secondary feed screw carried by said shaft and extending axially within the hollow conical primary feed screw and between the spaced connecting arms to permit passage of material between said arms to the space intermediate the primary and secondary feed screws, a filler secured in the lower portion of the cylindrical housing member to provide a bearing surface for a portion of the primary feed screw, a hopper mounted on the housing adjacent to the feed opening, a partition in said hopper coinciding with the base of the conical primary feed screw, and a bottom member in the cylindrical member of the housing between the base of the primary feed screw and that end wall through which the tubular shaft extends.

In testimony whereof I affix my signature.

HERBERT O. WINFREY.